(12) United States Patent
Agrawal et al.

(10) Patent No.: US 8,050,409 B2
(45) Date of Patent: Nov. 1, 2011

(54) THRESHOLD AND IDENTITY-BASED KEY MANAGEMENT AND AUTHENTICATION FOR WIRELESS AD HOC NETWORKS

(75) Inventors: Dharma P. Agrawal, Cincinnati, OH (US); Hongmei Deng, Cincinnati, OH (US); Anindo Mukherjee, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 1521 days.

(21) Appl. No.: 11/098,250

(22) Filed: Apr. 4, 2005

(65) Prior Publication Data

US 2006/0023887 A1    Feb. 2, 2006

Related U.S. Application Data

(60) Provisional application No. 60/558,845, filed on Apr. 2, 2004.

(51) Int. Cl.
*H04L 9/08* (2006.01)
(52) U.S. Cl. .................. 380/278; 713/163; 380/286
(58) Field of Classification Search .............. 713/156; 380/278, 281, 44–47, 283–285
See application file for complete search history.

(56) References Cited

U.S. PATENT DOCUMENTS 7,113,594 B2 * 9/2006 Boneh et al. ............ 380/28

OTHER PUBLICATIONS

Pedersen, Torben P. et al. A Threshold Cryptosystem without a Trusted Party. 1991, Springer-Verlag Berlin Heidelberg. Advances in Cryptology—Eurocrypt '91, LNCS 547, p. 522-526.*
Khalili et al. "Toward Secure Key Distribution in Truly Ad-Hoc Networks", IEEE, 2003.*
Gennaro et al. "Secure Distributed Key Generation for Discrete-Log Based Cryptosystems", Springer-Verlag, 1999.*
Boner, D., et al., "Identity-Based Encryption From the Weil Pairing", Siam J. Comput., 2003 Society for Industrial and Applied Chemicals, pp. 586-615, vol. 32, No. 3.

(Continued)

*Primary Examiner* — Gilberto Barron, Jr.
*Assistant Examiner* — Virginia T Ho
(74) *Attorney, Agent, or Firm* — Dinsmore & Shohl, LLP

(57) ABSTRACT

As various applications of wireless ad hoc network have been proposed, security has become one of the big research challenges and is receiving increasing attention. The present invention provides for a distributed key management and authentication approach by deploying the recently developed concepts of identity-based cryptography and threshold secret sharing. Without any assumption of pre-fixed trust relationship between nodes, the ad hoc network works in a self-organizing way to provide the key generation and key management service, which effectively solves the problem of single point of failure in the traditional public key infrastructure (PKI)-supported system. The identity-based cryptography mechanism provided not only to provide end-to-end authenticity and confidentiality, but also saves network bandwidth and computational power of wireless nodes.

15 Claims, 1 Drawing Sheet

Average PKG Service Time

OTHER PUBLICATIONS

Cha, J. C., et al., "An Identity-Based Signature from Gap Diffie-Hellman Groups", PKC 2003, LNCS 2567, pp. 18-30, Springer-Verlag, Berlin, Heidelberg, Y.G. Desmedt (Ed.).

Kong, J., et al., "Providing Robust and Ubiquitous Security Support for Mobile Ad-Hoc Networks", Proceedings for the IEEE $9^{th}$ International Conference on Network Protocols (ICNP'01), 2001, pp. 251-260.

Lynn, B., "Authenticated Identity-Based Encryption", IACR ePrint, Jun. 4, 2002, pp. 1-9.

Paterson, K. G., "ID-based Signatures from Pairing on Elliptic Curves", Cryptology ePrint Archive, Report 2002/004, http://eprint.iacr.org, pp. 1-4.

Pedersen, T.P., "A Threshold Cryptosystem without a Trusted Party" (Extended abstract), 1998, pp. 522-526, Springer-Verlag.

Shamir, A., "How to Share a Secret", Communications of the ACM, Nov. 1979, pp. 612-613, vol. 22, No. 11.

Zhou, L., et al., "Securing Ad Hoc Networks", IEEE Networks Special Issue on Network Security, Nov./Dec. 1999, pp. 24-30.

\* cited by examiner

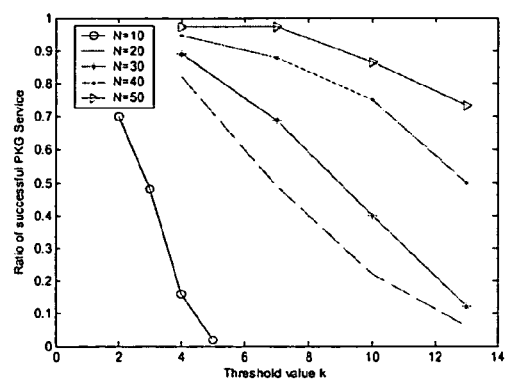
Figure 1. Ratio of Successful PKG Service
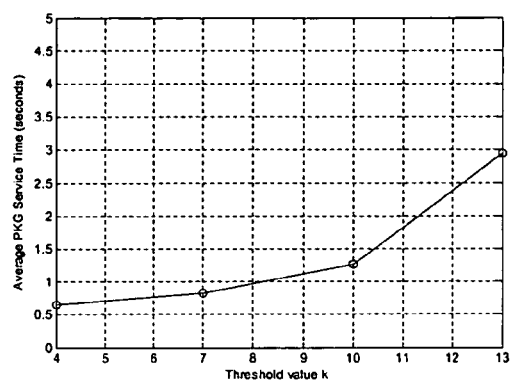
Figure 2. Average PKG Service Time

THRESHOLD AND IDENTITY-BASED KEY MANAGEMENT AND AUTHENTICATION FOR WIRELESS AD HOC NETWORKS

CROSS REFERENCE TO RELATED APPLICATIONS

This application claims the benefit of U.S. Provisional Patent Application Ser. No. 60/558,845, filed Apr. 2, 2004, which application is hereby incorporated by reference in its entirety.

FIELD OF THE INVENTION

The present invention relates generally to methods for threshold secret sharing using identity-based cryptosystem to provide end-to-end authentication in ad hoc networks. In one embodiment, the network is wireless.

BACKGROUND OF THE INVENTION

In recent reports on securing wireless ad hoc networks, several good security approaches have been proposed, and generally they can be categorized as asymmetric and symmetric schemes. Most of the approaches make an assumption that efficient key distribution and management is implemented by some kind of a key distribution center or certificate authority (CA), which has super power to keep serving the network and can not be compromised. However, to maintain the super server safely and also to keep it available when needed presents another big issue.

To mitigate this problem, the concept of threshold secret sharing has recently been introduced and there are two proposed approaches using threshold cryptography to distribute the services of certificate authority in wireless ad hoc networks. Zhou and Hass [4] firstly proposed a partially distributed certificate authority scheme, in which a group of special nodes is capable of generating partial certificates using their shares of the certificate signing key. A valid certificate can be obtained by combining k such partial certificates. The weakness of the solution is that it requires an administrative infrastructure available to distribute the shares to the special nodes. The scheme is further complicated by the normal nodes' need to locate the server nodes. Keeping the n special nodes available when needed makes the system maintenance difficult. In [5], Kong proposed another threshold cryptography scheme to wireless ad hoc networks by distributing the RSA certificate signing key to all the nodes in the network.

This scheme can be considered as a fully distributed certificate authority, in which the capabilities of certificate authority are distributed to all nodes and any operations requiring the certificate authority's private key can only be performed by a coalition of k or more nodes. This solution has a good availability since all nodes are part of the certificate authority service, it is easier for a node to locate k neighbor nodes and request the certificate authority service.

BRIEF SUMMARY OF THE INVENTION

Wireless ad hoc networks, as a new wireless paradigm of wireless communication, have attracted a lot of attentions recently. It is formed on-the-fly, and employs multi-hop routing to transmit information. The primary advantage of such a network is the underlying self-organizing and infrastructure-less property, which provides an extremely flexible method for establishing communications in situations where geographical or terrestrial constraints demand totally distributed networks, such as battlefields, emergency, and disaster areas. While the great flexibility of wireless ad hoc networks also brings a lot of research challenges, one of the important issues is security. Recent researches have shown that wireless ad hoc networks are highly vulnerable to various security threats due to their inherent characteristics [1, 4-10]. As ad hoc networking somewhat varies from the traditional approaches, the security aspects that are valid in the networks of the past are not fully applicable in ad hoc networks.

The absence of a centralized control in wireless ad hoc networks makes key management more difficult. Unlike traditional networks using dedicated nodes to support network functions, in wireless ad hoc networks all the network functions are performed by the mobile nodes themselves within the network, and each one has equal functionality. There are no dedicated service nodes which can work as a trusted authority to generate and distribute the network keys. The traditional public key infrastructure (PKI)-supported approach works well in wired networks, but it is inadequate for the wireless ad hoc environment. In general, PKI-based approaches require a global trusted certificate authority (CA) to provide certificates for the nodes of the network, and the certificates can be verified using the CA's public key. However, ad hoc networks do not possess such an infrastructure characteristics. Even if the service node can be defined, maintaining such a centralized server and keeping its availability to all the nodes in such a dynamic network is not feasible. Moreover, the service node is prone to single point of failure.

Low resource availability necessitates efficient resource utilization and prevents the use of complex authentication and encryption algorithms. Most often, mobile nodes in ad hoc networks rely on batteries as their power source, and may also have constrained computational abilities. Traditional PKI-based authentication and encryption mechanisms are relatively expensive in terms of generating and verifying digital signatures, which limit their practical application to wireless ad hoc networks. Symmetric cryptography is more efficient due to its less computational complexity, in which the communicating parties share a secret key. But when using it in wireless ad hoc networks, the problem is how to distribute the shared keys in the first place.

The present invention fulfills these two key requirements and provides a distributed key management and authentication approach in ad hoc networks using recently developed concepts of identity-based cryptography [2] and threshold secret sharing [2].

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

All publications mentioned herein are incorporated herein by reference for the purpose of describing and disclosing the compositions and methodologies, which are described in the publications, which might be used in connection with the presently described invention. The publications discussed herein are provided solely for their disclosure prior to the filing date of the present application. Nothing herein is to be construed as an admission that the invention is not entitled to antedate such a disclosure by virtue of prior invention.

BRIEF DESCRIPTION OF THE FIGURES

This invention, as defined in the claims, can be better understood with reference to the following drawings:

FIG. 1 shows the ratio of successful PKG issuing by varying the value of threshold. In PKG service, large threshold value requires the node to collect a large number of shares for combining its private key.

FIG. 2 shows the average PKG service time to a new joining mobile node for different threshold values. We fix the network size to 50 and vary the threshold value from k=4 to k=13.

In the following description of the illustrated embodiments, references are made to the accompanying drawings, which form a part hereof, and in which is shown by way of illustration various embodiments in which the invention may be practiced. It is to be understood that other embodiments may be utilized, and structural and functional changes may be made without departing from the scope of the present invention.

DETAILED DESCRIPTION OF THE INVENTION

Before the present device and methods are described, it is to be understood that this invention is not limited to the specific methodology, devices, formulations, and compositions described as such may, of course, vary. It is also to be understood that the terminology used herein is for the purpose of describing particular embodiments only, and is not intended to limit the scope of the present invention, which will be limited only by the appended claims.

It must be noted that as used herein and in the appended claims, the singular forms "a", "and", and "the" include plural referents unless the context clearly dictates otherwise. Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

The present intention provides for another approach based on threshold secret sharing, but instead of using the traditional public key cryptography mechanism, the present invention uses identity-based cryptosystem to provide end-to-end authentication in wireless ad hoc networks.

The security solution described does not rely on any assumption of underlying key management sub-system. That is, there is no trusted authority to generate and distribute the public/private keys and there is no pre-built trust association between nodes in the network. All the keys used are generated and maintained in a self-organizing way within the network.

It is assusmed that each mobile node carries an IP address or an identity, which is unique and unchanged during its lifetime in the ad hoc network. The IP address or identity can be obtained through some dynamic address allocation and auto-configuration, only if the address is selected without any conflict with other nodes in the network. It is also assumed that each mobile node has a mechanism to discover its one-hop neighborhood and to get the identities of other nodes in the network.

Key Management and Authentication

The present approach comprises of two components: distributed key generation and identity-based authentication. The key generation component provides the network master key pair and the public/private key pair to each node in a distribute way. The generated private keys are used for authentication. Identity-based authentication mechanism provides end-to-end authentication and confidentiality between the communication nodes. If the authentication process succeeds, the communication nodes exchange a session key, which can be used for future communication.

Consider an ad hoc network with n nodes in the initial phase. The network has a public/private key pair, called master key <PK, SK>, which is used to provide key generation service to all the nodes in the network. The master key pair is generated in such a manner that the master PK is well known to all the nodes in the network, and the master private key SK is shared by all of them in a (k, n) threshold fashion. Each of them holds a unique secret share of the master private key SK, and no one is able to reconstruct the master private key based on its own information. Any k nodes among them can reconstruct the mater private key jointly, whereas it is infeasible for at most k−1 nodes to do so, even by collusion. As mentioned earlier, every mobile node has a unique IP address or identity when it joins the network. In the following description, identity is used to refer to this. Each node within the network needs to obtain its personal private key corresponding to its identity and register to the network before utilizing any network service.

The following Sections describe the basic operations of the invention: master public/private key generation, distributed private key generation service, new master private key share creation, and authentication.

Master Key Generation

Our distributed key generation mechanism does not need the support of the trusted third party to safely compute a master key, separate it into multiple pieces (shares) and then distribute the shares to shareholders. Instead, the master key pair is computed collaboratively by the initial network nodes without constructing the master private key at any single node. The scheme used [6] is an extension to Shamir's secret sharing [2] without the support of a trust authority. In the scheme, each node $C_i$ randomly chooses a secret $x_i$ and a polynomial $f_i(z)$ over $Z_q$ of degree k−1, such that $f_i(0)=x_i$. Node $C_i$ computes his sub-share for node $C_j$ as $ss_{ij}=f_i(j)$ for j=1,2 . . . n and sends $s_{ij}$ securely to $C_j$. After sending the n−1 sub-shares, node $C_j$ can computes its share of master private key as $$S_j = \sum_{i=1}^{n} ss_{ij} = \sum_{i=1}^{n} f_i(j).$$

That is, the master key share of node $C_j$ is combined by the sub-shares from all the nodes, and each of them contributes one piece of that information. Similarly, any coalition of k shareholders can jointly recover the secret as in basic secret sharing using $$\sum_{i=1}^{k} S_i l_i(z) \bmod q,$$

where $l_i(z)$ is the Lagrange coefficient. It is easy to see that the jointly generated master private keys $$S = \sum_{i=1}^{n} x_i = \sum_{i=1}^{n} f_i(0).$$

The present invention also deploys the verifiable secret sharing to detect the invalid share that some shareholders generate to prevent the reconstruction of the secret key.

After the master private key is shared, each shareholder publishes $S_iP$, where P is a common parameter used by the identity-based scheme [2]. Then the master public key can be computed as $$Q_M = \sum_{i=1}^{n} S_i P.$$

Distributed Private Key Generation

Using the identity-based cryptography, a mobile node's public key can be any arbitrary string. In our scheme, the public key is computed as $Q_{ID}=H(ID||Expire\_time)$, where H( ) stands for an hash function defined in identity-based encryption [2], ID represents the identity of the node, and Expire_time is a time stamp protecting from the private key loss. When the public-key gets expired, the node needs to obtain its new public key and corresponding private key. To utilize the network service and decrypt the message encrypted using its public key $Q_{ID}$ from other nodes, the node also needs to obtain its corresponding private key. The way to obtain the private key is to contact at least k neighbor nodes, present the identity and request private key generation (PKG) service. The node that holds the master key share can be the PKG service node. In our scheme, all the network nodes share the master private key, thus each of them can be the PKG service node. Each of the k PKG service nodes generates a secret share of a new private key sk and sends to the requesting node. To make sure the generated shares are securely transmitted, the requesting node may also present its self-generated temporary public key when sending request. Each of the PKG service nodes sends encrypted share to the requesting node using the requesting node's temporary public key pk-temp. The process of generation of a share of the new secret key sk can be represented by $sk_i=S_iQ_{ID}$, where $S_i$ (i= 1, . . . , k) is the share of the master private key of the serving node, ID is the identity of the requesting node, $Q_{ID}$ is its public key, and $sk_i$ denotes the generated private key share for the requesting node.

Since we would like to make this public key information well-known to the whole network, we also define the public key as the requesting node's network identifier (NID). The serving nodes broadcast the requesting node's NID information to the network. By collecting the k shares of its new private key, the requesting node would compute its new private key $sk=\Sigma_{i=1}^{k}S_iQ_{ID}$. It discards its temporary public/private key pair, and keeps the new key pair in its memory for the later authentication and communication. After this key generation process, the requesting node obtains its new private key sk and all other nodes would register the requesting node into their registration table by entering the node's NID. It is easy to see that an adversary cannot duplicate the existing identity in the network given the assumptions that the node's identity is identical. One possibility is that the node who needs PKG service cannot get k neighbor nodes reachable. In this case, mobility can help solve this problem. The requesting node can move to discover more nodes in order to obtain k shares.

New Master Key Share Creation

When a new node joins a network, it presents its identity, self-generated temporary public key, and some other required physical proof (depending on key issuing policy) to k neighbor nodes and requests PKG service, the master public key and his share of the master private key. Each node in the coalition verifies the validity of the identity of the new node $C_p$. If the verification process succeeds, the private key can be generated using the method described in the previous section. To initialize the share of master key for the requesting node, each coalition node $C_i$ generates the partial share $s_{ip}=s_i \cdot l_i(p)$ for node $C_p$. Here, $l_i(p)$ is the Lagrange term. It encrypts the partial share using the temporary public key of requesting node and sends it to node $C_p$. Node $C_p$ obtains its new share by adding the partial shares as $$S_p = \sum_{j=1}^{k} s_{p,j}.$$

Note that the partial shares may be shuffled before being sent to the joining node to protect the secrecy of the coalition nodes' secret shares [5]. After obtaining the share of the master private key, the new joining node is available to provide PKG service to other joining nodes.

Identity-based Authentication

All the keys generated in the previous phase are used for authentication. Authentication enables a mobile node to ensure the identity of the peer node it is communicating with, so that no attacker could masquerade a node, thus gaining unauthorized access to resource and sensitive information. Our approach using identity-based encryption provides end-to-end authentication. The basic mechanism of identity-based authentication follows the PKI-support approaches, but handshake and exchange of certificates is not necessary. Suppose source node S wants to send node D an authenticated message, such that only node D can decrypt. Moreover, the node D can make sure that the message is really from the source node S. Source node S simply can simply signs the message using its private key, encrypts using the destination node's identity (public key) and sends it to the destination node. When the destination node receives this encrypted message, it decrypts it first using its private key, and then using the source node's public key. If the verification process succeeds, the destination node accepts this packet as a valid message. The functions of identity-based encryption and signature are defined in [2][7].

The above described authentication process is a sign-and-encryption procedure, in which digital signature is used for the authentication of messages and encryption is used for the confidentiality of messages. Alternatively, authentication can be obtained using a more efficient method. By modifying the identity-based cryptosystem slightly, the communicating nodes can generate a shared secret (session key) on both sides without additional key exchange [8]. One source node side, the shared secret is generated using source node's private key and the destination node's public key, while the destination node compute this secret using its private key and source node's public key. The generated shared secret can be used as a symmetric key to encrypt and authentication.

Performance Analysis

TABLE 1

Master Key Generation Time

| Network Size | Time(s) |
| --- | --- |
| 10 | 0.78 |
| 20 | 13.55 |
| 30 | 40.82 |
| 40 | 57.12 |
| 50 | 98.28 |

In this Section, we first analyze the present methods in terms of communication overhead and the present some simulation results.

Communication Overhead

Compared with the traditional PKI supported security solutions, the present method has a lower communication overhead. In our approach, the public/private key pair is generated by the PKG service nodes, and the public key is derived from the node's identity, which is well-known information. Thus, there is no need for certificate generation, propagation, and storage. In addition, the public key in our approach is based on each node's identity, which can be very much shorter as compared to the 1024 bits public key in RSA cryptosystem. The properties of using shorter public/private key pair and without spreading the long-size certificates reduce the computational consumption and communicational overhead.

The communication overhead in our approach is mainly introduced by key generation component. In the network initial phase, n nodes need to jointly generate the master key pair in a self-organizing way, which increases the network setup time. Moreover, every mobile node needs to broadcast a key generation request to its neighborhood, and each PKG service node replies by sending the sub-share of the private key of the requesting node. The PKG service in the network initial phase also causes more communication overhead. But it is a tradeoff between security and communication overhead. We use threshold secret sharing to enhance the fault-tolerance of the network, at the same time introduce more communication overhead to the network. One interesting point is that if we implement a similar system with the same properties using traditional PKI based approaches, a much larger communication overhead is expected.

Simulations

To further evaluate the performance, we run simulations on a Linux machine P4-2.0 GHz with 512MRAM. We implement identity-based encryption into ns-2 [10] environment, in which the IEEE 802.11 is used in MAC layer. The mobile nodes move from a random starting point to a random destination with a maximum speed of each node is 5 m/s and pause time of 10 seconds. We vary the network size of {10, 20, 30, 40, 50} and measure the average time taken to jointly generate the maser private key, the ratio of successful PKG service, and the time taken by the PKG service.

Table 1 shows the time for master key generation in terms of different network size. When we increase the network size from 10 to 50, the master key generation time is also increased. This observation can be easily explained as the result of more transmission delay. To get a master key share, each mobile node needs to get message from any of the n−1 node. As we enlarge the network size, the number of transmitted message exploded, which results in a large transmission delay. From this observation, we can also get that the distributed master key generation is not suitable for large size ad hoc networks; otherwise the network setup time would be long. One way to address this problem is to initialize a portion of the network nodes, that is, the master private key is first shared by part of the network nodes, and these initialized nodes can be used to initialize other nodes in a (k, n) threshold way.

FIG. 1 shows the ratio of successful PKG issuing by varying the value of threshold. In PKG service, large threshold value requires the node to collect a large number of shares for combining its private key. However, in some situation, the requesting node only has a few neighbors, i.e., it can not get enough number of shares. We count this situation as an unsuccessful PKG service. From FIG. 1, the ratio of successful PKG service decreases as we increase the value of threshold. That means, when we vary the value of threshold from low to high, more and more mobile nodes could not get enough number of neighbors for PKG service. For an example, when the network size is 30, the ratio is 89% for threshold value k=4. While the ratio decreases to only 12% if we choose threshold value k=13. For different network size, we have the similar observation. In FIG. 2 we also give the average PKG service time to a new joining mobile node for different threshold values. We fix the network size to 50 and vary the threshold value from k=4 to k=13. As expected, the average PKG service time for smaller threshold value is shorter, but it grows rapidly as we increase the value of threshold. Thus, choosing an appropriate threshold value for different network size is important in the real network applications.

REFERENCES

[1] D. P. Agrawal and Q-A. Zeng, *Introduction to Wireless and Mobile Systems*, Brooks/Cole publisher, 2003.

[2] D. Bonh and M. Franklin, "Identity-Based Encryption from Weil Pairing," *Advances in Cryptology, CRYPTO 2001, Lecture Notes in Computer Science*, Vol. 2139, pp. 213-229, Springer Verlag, 2001.

[3] A. Shamir, "How to Share a Secret," *Communications of the ACM*, Vol. 22, No. 11, pp. 612-613, November 1979.

[4] L. Zhou and Z. J. Hass, "Securing Ad Hoc Networks," *IEEE Networks Special Issue on Network Security*, November/December, 1999.

[5] J. Kong, P. Zerfos, H. Luo, S. Lu and L. Zhang, "Providing Robust and Ubiquitous Security Support for Mobile Ad-Hoc Networks," *Proceedings of the IEEE 9th International Conference on Network Protocols (ICNP '01)*, 2001.

[6] T. P. Pedersen, "A Threshold Cryptosystem Without A Trusted Party," *EUROCRYPT*, 1991.

[7] K. G. Paterson, "ID-based Signatures from Pairing on Elliptic Curves," *Cryptology ePrint Archive, Report* 2002/004, http://eprint.iacr.org/.

[8] B. Lynn, "Authenticated Identity-Based Encryption," *IACR eprint, report* 2002.

[9] J. C. Cha and J. H. Cheon, "An Identity-based Signature from Gap Diffie-Hellman Groups," *Cryptology ePrint Archive*, Report 2002/018, http://Heprint.iaccr.org/.

[10] K. Fall and E. Varadhanm, *The ns Manual* (Formely ns Notes and Documentation), 2000.

We claim:

1. A method of generating and distributing keys used to secure communications between a plurality of network nodes each having a unique identity in an ad hoc network having neither a centralized trusted authority nor dedicated nodes to generate and distribute the keys, said method comprising:

distributing a key generation mechanism to each network;

using the distributed key generation mechanism to generate one unique master private key sub-share per each network node;

distributing the master private key sub-shares generated to the respective network nodes;

each network node using the distributed sub-shares to compute a share $S_i$ of a master private key S, wherein i is i=1, 2, . . . n such that $S_i$ represents a respective share of the $i^{th}$ node, wherein n is a total number of network nodes;

sharing the share $S_i$ of the master private key S among the network nodes along with a common parameter P;

using the distributed key generation to generate a master public key $Q_M$ using the share $S_i$ of the master private key S along with the common parameter P;

generating and distributing an individual public key $Q_{ID}$ and an individual private key sk;

wherein the generating and distributing of the individual public key $Q_{ID}$ comprises hashing the unique identity of a network node with a time stamp;

wherein the generating of the individual private key sk comprises:

a requesting node requesting private key generation service from at least k neighbor nodes and presenting the individual public key $Q_{ID}$ and a temporary public key to said k neighbor nodes;

each of k neighbor nodes computing a share $sk_i$ of the individual private key sk as $S_i Q_{ID}$, where $S_i$ (i=1, . . . , k) is the share of the master private key S of the neighbor node and $Q_{ID}$ is the individual public key of the requesting node;

each neighbor node encrypting its share $sk_i$ of the individual private key sk using the requesting node's temporary public key;

each neighbor node sending its encrypted share $sk_i$ of the individual private key sk to the requesting node;

the requesting node decrypting the encrypted shares of the individual private key sk with a temporary private key corresponding to the temporary public key; and the requesting node computing its individual private key sk as $$\sum_{i=1}^{k} sk_i = \sum_{i=1}^{k} S_i \, Q_{ID}.$$

2. The method of claim 1, wherein the unique identity comprises an IP address, email address, or name.

3. The method of claim 1, wherein the ad hoc network comprises a wireless ad hoc telecommunications system.

4. The method of claim 1, wherein all network nodes share the master private key S without construction of the master private key at a single node.

5. The method of claim 1, wherein all network nodes share the master private key S in threshold (k, n) fashion, where n is the total number of network nodes and k is minimum number of network nodes required to generate master private key S.

6. The method of claim 1, wherein generation of the master private key S comprises:

each of the network nodes randomly choosing a secret $x_i$ and a polynomial $f_i(z)$ over Zq of degree k−1, such that $f_i(0)=x_i$, wherein i is i=1, 2, . . . k such that $x_i$ represents a respective secret of the $i^{th}$ node;

each of the network nodes computing a sub-share $ss_{ij}$ of the master private key S for one network node $C_j$ as $f_i(j)$ for j=1, 2. . . n;

each of the network nodes securely sending its sub-share $ss_{ij}$ of the master private key S to one network node $C_j$;

node $C_j$ computing a share $S_j$ of the master private key S by adding the sub-shares $ss_{ij}$ of the master private key S as $$\sum_{i=1}^{n} ss_{ij} = \sum_{i=1}^{n} f_i(j);$$

and any coalition of nodes computing the master private key S as $$\sum_{i=1}^{k} S_i l_i(z) \bmod q,$$

wherein k is a minimum number of nodes required to recover the master private key S and li(z) is the Lagrange coefficient.

7. The method of claim 1, wherein sharing the master private key share comprises publishing $S_i P$ to the network, wherein P is a common parameter.

8. The method of claim 1, wherein the master public key $Q_M$ is computed as $$\sum_{i=1}^{n} S_i P,$$

wherein n is the total number of network nodes, $S_i$ comprises the share of the master private key, and P is the common parameter.

9. The method of claim 1, wherein the neighbor nodes broadcast the requesting node's individual public key $Q_{ID}$ information to the network.

10. The method of claim 1, wherein the neighbor nodes register the requesting node's individual public key in register tables.

11. The method of claim 1, wherein any network node that holds a share of the master private key S is a private key generation service node.

12. The method of claim 1, further comprising generation of a master private key share for a node joining the network after network inception.

13. The method of claim 1, wherein secure communications comprises:

a source node sn signing a message to a receiving node rn using its individual private key, encrypting the message using the unique identity of a receiving node, and sending the encrypted message to the receiving node; and the receiving node rn receiving the encrypted message and decrypting the message using its individual private key and an individual public key of the source node.

14. A method of generating and distributing keys used to secure communications between a plurality of network nodes each having a unique identity in an ad hoc network having neither a centralized trusted authority nor dedicated nodes to generate and distribute the keys, said method comprising:

distributing a key generation mechanism to each network;

using the distributed key generation mechanism to generate one unique master private key sub-share per each network node;

distributing the master private key sub-shares generated to the respective network nodes;

each network node using the distributed sub-shares to compute a share $S_i$ of a master private key S, wherein i is i=1, 2, . . . n such that $S_i$ represents a respective share of the $i^{th}$ node, wherein n is a total number of network nodes;

sharing the share $S_i$ of the master private key S among the network nodes along with a common parameter P, and using the distributed key generation to generate a master public key $Q_M$ using the share $S_i$ of the master private key S along with the common parameter P;

generating a master private key share for a node joining the network after network inception and;

wherein the generation of a master private key share comprises:

joining node $C_p$ generating an individual public key $Q_{ID}$;

the joining node $C_p$ presenting its unique identity, individual public key $Q_{ID}$, and a required physical proof to k neighbor nodes;

the joining node $C_p$ requesting the master public key $Q_M$ and a share $S_P$ of the master private key S;

each of the k neighbor nodes verifying the unique identity of the joining node $C_p$;

each of the k neighbor nodes generating a sub-share $ss_{ip}$ of the master private key S for the joining node $C_p$ as $ss_{ip}=S_i \cdot l_i(p)$, where $l_i(p)$ is the Lagrange coefficient;

each of the k neighbor nodes encrypting its sub-share $ss_{ip}$ of the master private key S using the individual public key $Q_{ID}$ of the joining node $C_p$;

each of the k neighbor nodes sending its sub-share of the master private key S to the joining node $C_p$; and the joining node $C_p$ computing its new share of the master private key S as $$\sum_{i=1}^{k} ss_{ip}.$$

15. The method of claim 14, wherein the sub-shares of the master private key S are shuffled before being sent to the joining node $C_p$.

* * * * *